Feb. 16, 1926.

C. W. PLEUKHARP

GLASS FLOWING DEVICE

Filed Feb. 23, 1922

INVENTOR
*C.W.Pleukharp*
BY
*Chas. E. Townsend*
ATTORNEY

Feb. 16, 1926.
C. W. PLEUKHARP
1,573,273
GLASS FLOWING DEVICE
Filed Feb. 23, 1922
2 Sheets-Sheet 2
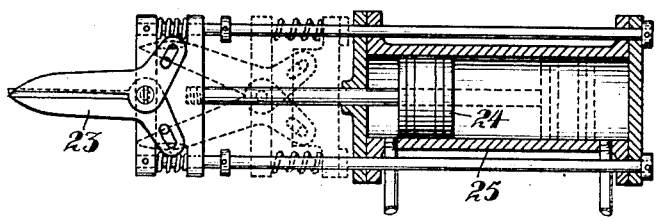
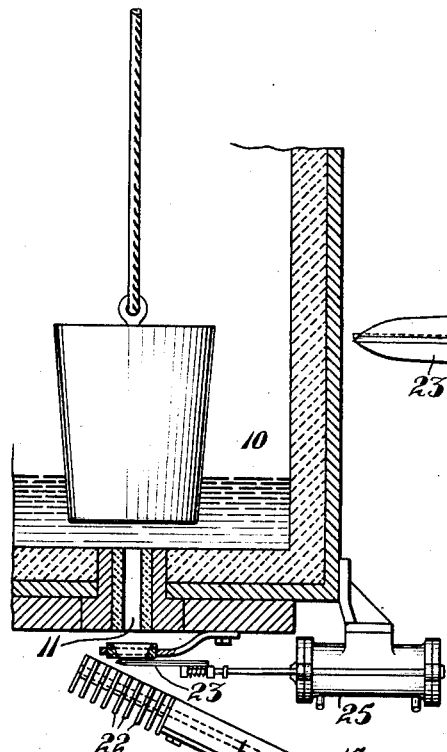
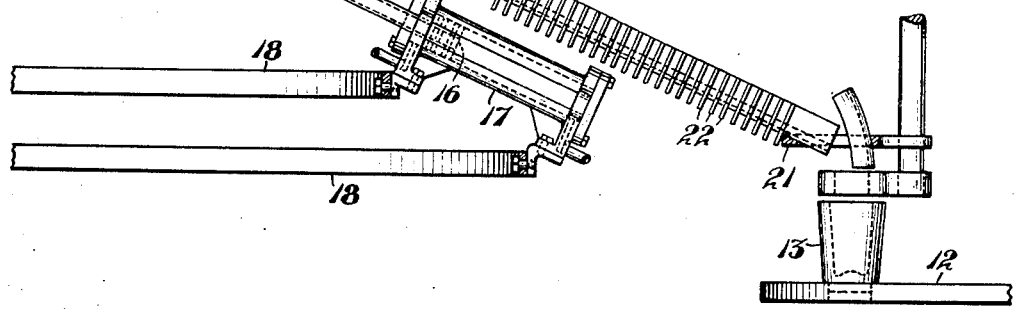
INVENTOR
C. W. Pleukharp
BY
ATTORNEY Patented Feb. 16, 1926.

1,573,273

UNITED STATES PATENT OFFICE.

CLAUDE W. PLEUKHARP, OF SAN FRANCISCO, CALIFORNIA, ASSIGNOR TO ILLINOIS-PACIFIC GLASS CO., OF SAN FRANCISCO, CALIFORNIA, A CORPORATION OF CALIFORNIA.

GLASS-FLOWING DEVICE.

Application filed February 23, 1922. Serial No. 538,528.

*To all whom it may concern:*

Be it known that I, CLAUDE W. PLEUK-HARP, a citizen of the United States, residing at the city and county of San Francisco and State of California, have invented new and useful Improvements in Glass-Flowing Devices, of which the following is a specification.

This invention relates to glass delivering devices and has for its object to increase the production thereof, and also to facilitate the adjustment control of the same.

In carrying out this object, I make use of a series of troughs or chutes arranged radially about a single charging vessel, each of the chutes connecting with a turret or mold-carrying device and being provided at its inner end with a reciprocating part so controlled and actuated as to move forwardly into position beneath the charging nozzle to receive its charge of molten glass, the reciprocating parts of the other chutes following in succession.

The controlling means is so arranged as to allow any one of the chutes to be cut out without interrupting or interfering with the operation of the others.

The apparatus employed in prior devices is such as to limit the number of turrets or mold-carrying devices to two, because of the fact that a swinging chute is employed beneath the charging nozzle and its action is such that only two troughs or conduits leading to the molds can be supplied. In the present invention by dispensing with the swinging chute and using the reciprocating extensions for each of a series of chutes or troughs, I can supply any number of turret molds and thereby greatly increase the production of the device.

One form which my invention may assume is exemplified in the following description and illustrated in the accompanying drawings, in which—

Fig. 2 shows a vertical, sectional view of the charging vessel with one of the chutes embodying my invention arranged beneath the same.

Fig. 3 shows a sectional view of the shears and operating means therefor employed for severing the streams of molten glass.

Figure 1:
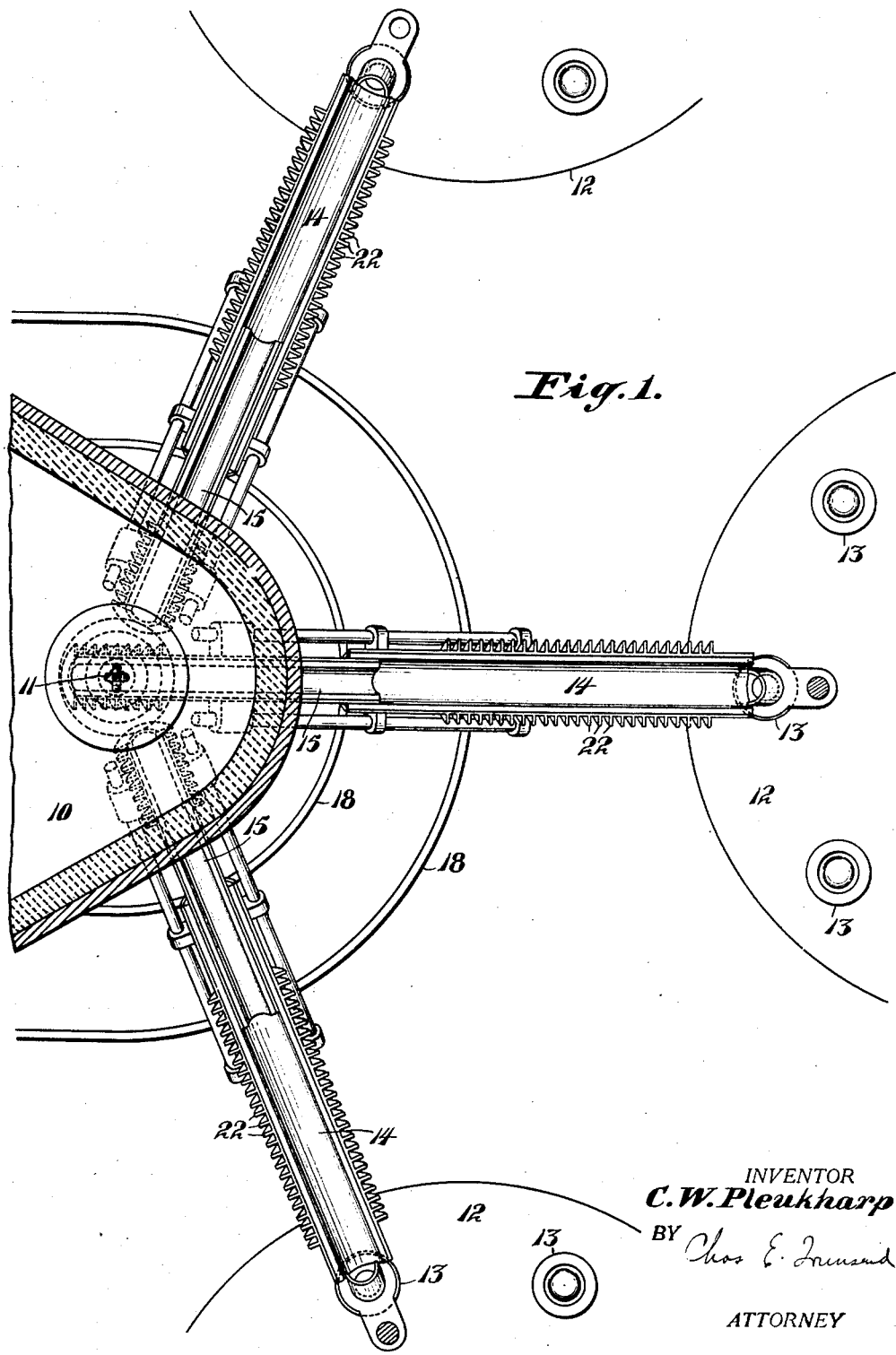
Fig. 1 shows a plan view, in section, of the charging vessel with three chutes and mold-carrying devices arranged about the same.

I show a charging vessel at 10, having a single nozzle 11, through which a stream of molten glass continuously passes. Around the charging vessel, at suitable intervals, I show turrets 12 each carrying a number of molds 13. Between the charging vessel and each mold-carrying device is a chute or trough formed of a stationary lower section 14 and a reciprocating upper section 15. The upper section terminates near the nozzle 11 and is actuated by a piston 16 working in a compressed air cylinder 17.

The cylinder 17 is shown as mounted on supports 18, and the reciprocating portion 15 is supported by a connection 19 upon the rod of the piston 16. The lower section 14 is preferably mounted upon the cylinder by means of a pivotal connection 20, near its upper end, and at its lower end rests upon a stationary support 21 connected with the mold-carrying device. By reason of this pivotal mounting for the lower section of the chute, molds of various heights can be accommodated.

I show the chutes fitted with radiating fins 22 to assist in cooling. Heretofore these chutes have been lined with a mixture of graphite and cement to prevent their burning out, and frequently particles of such substance are taken up by the molten glass and result in producing flaws in the molded articles. By using these radiating fins I find that I can dispense with the lining of graphite and cement and use merely a cast-iron chute, preferably copper-plated inside.

Beneath the nozzle 11 is a pair of shears 23, actuated by a piston 24 working in a compressed air cylinder 25. This type of shears being more or less common in the art, its operation will be understood.

The turrets which carry the molds are also operated by compressed air and the operating means for the shears, turrets and reciprocating chutes are so controlled as to act in timed relation, all in a manner well understood in the art and not necessary to be shown.

In the operation of the device the reciprocating chutes are normally retracted, and each one in its turn is advanced to receive a charge of molten glass from the charging vessel. The intention is to allow the glass to flow from the charging vessel in a constant stream without interruption by vacuum or suction means as in prior devices.

The operation of the shears is timed so as to cut off the stream at the proper moment so as to form a charge of the desired weight. As soon as the charge is received by the reciprocating chute, the latter is retracted and immediately thereafter the next chute in order is moved forwardly to receive its charge. As many chutes as desired may be arranged beneath the charging vessel, the only limit being the number of molds which can be kept heated. A device of this character has the capability of permitting any one of the chutes to be cut out without interfering with the operation of the others.

Various changes in the construction and arrangement of the several parts of the device herein shown and described may be employed without departing from the spirit of my invention as disclosed in the appended claims.

Having thus described my invention, what I claim and desire to secure by Letters Patent is—

1. In a glass flowing machine a charging vessel, a mold carrying device, an inclined chute arranged between, said chute having a reciprocating upper portion and a stationary lower portion, and a compressed air cylinder and piston for actuating the reciprocating portion.

2. In a glass flowing machine a charging vessel, a mold carrying device, an inclined chute arranged between for conveying charges of molten glass to the molds, said chute having a reciprocating upper portion and a stationary lower portion, and a pivotal mounting for the upper end of the stationary portion to permit the discharge end of the chute to be raised and lowered.

3. In a glass flowing machine, a charging vessel, a mold, and a telescopic chute being held fixed relative to the mold during a filling operation while elongating to establish communication between the charging vessel and the mold.

4. In a glass flowing machine, a charging vessel, a plurality of filling stations with which molds come to register, and extensible chutes fixed at their outer ends relative to said stations, and means for elongating the chutes whereby their inner ends may move to positions to establish a flow of glass from the charging vessel to the mold.

5. In a glass flowing machine, a charging vessel, a severing device adapted to control the gather of glass flowing from said vessel, a plurality of filling stations with which molds come to register, and extensible chutes fixed at their outer ends relative to said stations, and means for elongating the chutes whereby their inner ends may move to positions to establish a flow of glass from the charging vessel to the mold.

6. A plurality of mold filling stations, molds adapted to move into and out of register with said stations, extensible chutes fixed at their outer ends to said stations and adapted to conduct a gather of glass from the charging vessel to the receptive molds in register with said stations when the chutes are in their extensible positions, and means for actuating said chutes to extend and retract them.

CLAUDE W. PLEUKHARP.